(12) United States Patent
Ugalde

(10) Patent No.: US 7,964,008 B1
(45) Date of Patent: Jun. 21, 2011

(54) RESIDUAL GAS CLEANER

(76) Inventor: Hector Ugalde, Miami, FL (US)

( * ) Notice: Subject to any disclaimer, the term of this patent is extended or adjusted under 35 U.S.C. 154(b) by 509 days.

(21) Appl. No.: 12/129,781

(22) Filed: May 30, 2008

(51) Int. Cl.
*B01D 46/00* (2006.01)

(52) U.S. Cl. .......... 55/385.3; 55/311; 55/350.1; 55/419; 55/428; 55/429; 55/498; 96/421

(58) Field of Classification Search ............ 55/419, 55/428, 429, 498, 309, 310, 311, 312, 350.1, 55/426; 210/444, 443; 96/421
See application file for complete search history.

(56) References Cited

U.S. PATENT DOCUMENTS

| | | | | |
|---|---|---|---|---|
| 2,771,156 A | * | 11/1956 | Rohn et al. | 55/498 |
| 2,962,121 A | * | 11/1960 | Wilber | 55/480 |
| 3,257,783 A | * | 6/1966 | Baker et al. | 96/409 |
| 3,318,323 A | * | 5/1967 | White | 137/195 |
| 3,378,993 A | * | 4/1968 | Veres et al. | 96/409 |
| 3,418,789 A | * | 12/1968 | Hoffman et al. | 96/409 |
| 3,505,794 A | * | 4/1970 | Nutter et al. | 55/487 |
| 3,802,160 A | * | 4/1974 | Foltz | 95/273 |
| 4,336,043 A | * | 6/1982 | Aonuma et al. | 55/483 |
| 4,668,256 A | * | 5/1987 | Billiet et al. | 96/409 |
| 5,139,542 A | * | 8/1992 | Sowinski | 95/147 |
| 5,139,543 A | * | 8/1992 | Sowinski | 95/147 |
| 5,141,533 A | * | 8/1992 | Sowinski | 95/147 |
| 5,145,494 A | * | 9/1992 | Sowinski | 95/142 |
| 5,925,245 A | * | 7/1999 | Bradford et al. | 210/232 |
| 6,248,236 B1 | * | 6/2001 | Hodgkins | 210/232 |
| 6,409,786 B1 | * | 6/2002 | Wright et al. | 55/507 |
| 6,461,397 B1 | * | 10/2002 | Billiet | 55/498 |
| 7,182,864 B2 | * | 2/2007 | Brown et al. | 210/232 |
| 7,326,266 B2 | * | 2/2008 | Barnwell | 55/319 |
| 7,344,581 B2 | * | 3/2008 | Pearson et al. | 55/486 |
| 7,344,582 B2 | * | 3/2008 | Pearson et al. | 55/504 |
| 7,442,220 B2 | * | 10/2008 | Pearson et al. | 55/418 |
| 7,563,299 B2 | * | 7/2009 | Baptista da Costa et al. | 55/488 |
| 7,618,480 B2 | * | 11/2009 | Barnwell | 95/273 |
| 7,828,881 B2 | * | 11/2010 | Barnwell | 95/273 |
| 7,833,304 B2 | * | 11/2010 | Pearson et al. | 55/418 |

* cited by examiner

*Primary Examiner* — Robert A Clemente

(74) *Attorney, Agent, or Firm* — Albert Bordas, P.A.

(57) ABSTRACT

A residual gas cleaner, comprising a manifold assembly having at least first and second inlets and at least an outlet. The first inlet receives spent exhaust gas from an engine, and the second inlet receives clean gas from a fuel tank assembly. A housing assembly comprises a housing that is secured onto the manifold assembly. The housing collects the spent exhaust gas. The housing assembly further comprises draining means to drain the spent exhaust gas from the housing. A filter assembly comprises a filter extending from the manifold assembly and is housed within the housing. The filter assembly filters the spent exhaust gas to create filtered exhaust gas. The filtered exhaust gas exits the manifold assembly through the outlet to join the clean gas. The engine receives the filtered exhaust gas and the clean gas from the outlet.

14 Claims, 3 Drawing Sheets

RESIDUAL GAS CLEANER

BACKGROUND OF THE INVENTION

1. Field of the Invention

The present invention relates to engine accessories, and more particularly, to an apparatus that filters and re-circulates spent exhaust gas for engines.

2. Description of the Related Art

Engine productivity and efficiency is desired to obtain greater engine output and vehicle mileage. Applicant is not aware of any apparatus that cleans and reincorporates residual gases for engines having the characteristics defined herewith.

SUMMARY OF THE INVENTION

The instant invention is a residual gas cleaner, comprising a manifold assembly having at least first and second inlets and at least an outlet. The first inlet receives spent exhaust gas from an engine, and the second inlet receives clean gas from a fuel tank assembly. A housing assembly comprises a housing that is secured onto the manifold assembly. The housing collects the spent exhaust gas. The housing assembly further comprises draining means to drain the spent exhaust gas from the housing. A filter assembly comprises a filter extending from the manifold assembly and is housed within the housing. The filter assembly filters the spent exhaust gas to create filtered exhaust gas. The filtered exhaust gas exits the manifold assembly through the outlet to join the clean gas. The engine receives the filtered exhaust gas and the clean gas from the outlet.

The engine produces vacuum pressure to the outlet. The manifold assembly also comprises a pressure gauge assembly with determining means to determine pressure within the housing assembly. In addition, the manifold assembly further comprises an air filter assembly with filtering means to deliver filtered air to the housing assembly. The air filter assembly comprises a valve assembly with regulating means to regulate the amount of the filtered air delivered to the housing assembly. The draining means comprises the housing having a threaded cap at a distal end opposite the manifold assembly, to drain the spent exhaust gas from the housing. The filter assembly comprises a bolt having a threaded portion to secure the filter to the manifold assembly. The housing is elongated and the spent exhaust gas collects by gravity above the threaded cap. The spent exhaust gas is exterior to the filter and the filtered exhaust gas is interior to the filter. In the preferred embodiment, the filter is of predetermined layers of media and is elongated in shape to complement the housing.

It is therefore one of the main objects of the present invention to provide a residual gas cleaner that comprises a manifold assembly, a housing assembly, and a filter assembly.

It is another object of the present invention to provide a residual gas cleaner that filters and re-circulates spent exhaust gas for an engine.

It is another object of the present invention to provide a residual gas cleaner that filters and re-circulates spent exhaust gas for an engine to reduce engine emissions.

It is another object of the present invention to provide a residual gas cleaner that reduces carbon build-up in carburetors, fuel injectors, and combustion chambers.

It is another object of the present invention to provide a residual gas cleaner that produces better combustion within an engine's firing chamber cylinder.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
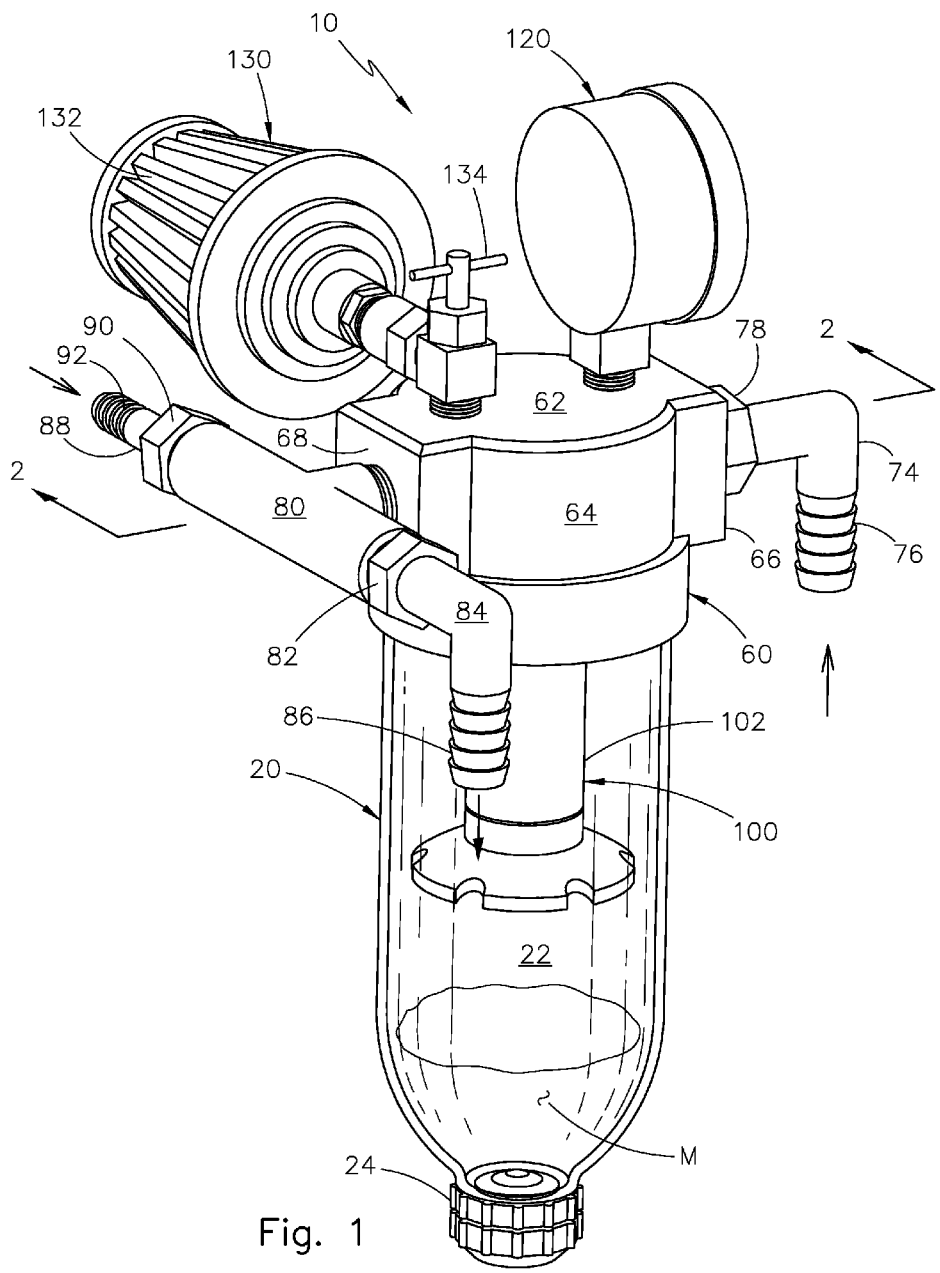
FIG. 1 represents an isometric view of the instant invention.

Referring now to the drawings, the instant invention is generally referred to with numeral 10. It can be observed that it basically includes housing assembly 20, manifold assembly 60, and filter assembly 100.

As seen in FIG. 1, housing assembly 20 comprises housing 22 that is secured onto manifold assembly 60. In the preferred embodiment, housing 22 is elongated. Housing assembly 20 comprises draining means to drain spent exhaust gas M from housing 22. Such draining means comprises threaded cap 24 that is removably mounted at a distal end of housing 22. Threaded cap 24 is positioned opposite from manifold assembly 60. When threaded cap 24 is removed, spent exhaust gas M drains by gravity from housing 22.

Manifold assembly 60 comprises top face 62, lateral wall 64, and sidewalls 66 and 68. In addition, manifold assembly 60 has inlets 74 and 88, and outlet 84. Inlet 74 comprises ridges 76 and nut 78. Inlet 88 comprises ridges 92 and nut 90. Outlet 84 comprises ridges 86 and nut 82. Mounted onto top face 62, manifold assembly 60 comprises air filter assembly 130. Air filter assembly 130 comprises air filter 132 and valve assembly 134. Valve assembly 134 has means to regulate the amount of filtered air delivered to housing assembly 20. Mounted onto top face 62, manifold assembly 60 also comprises pressure gauge assembly 120, which has means to determine pressure within housing assembly 20.

Figure 2:
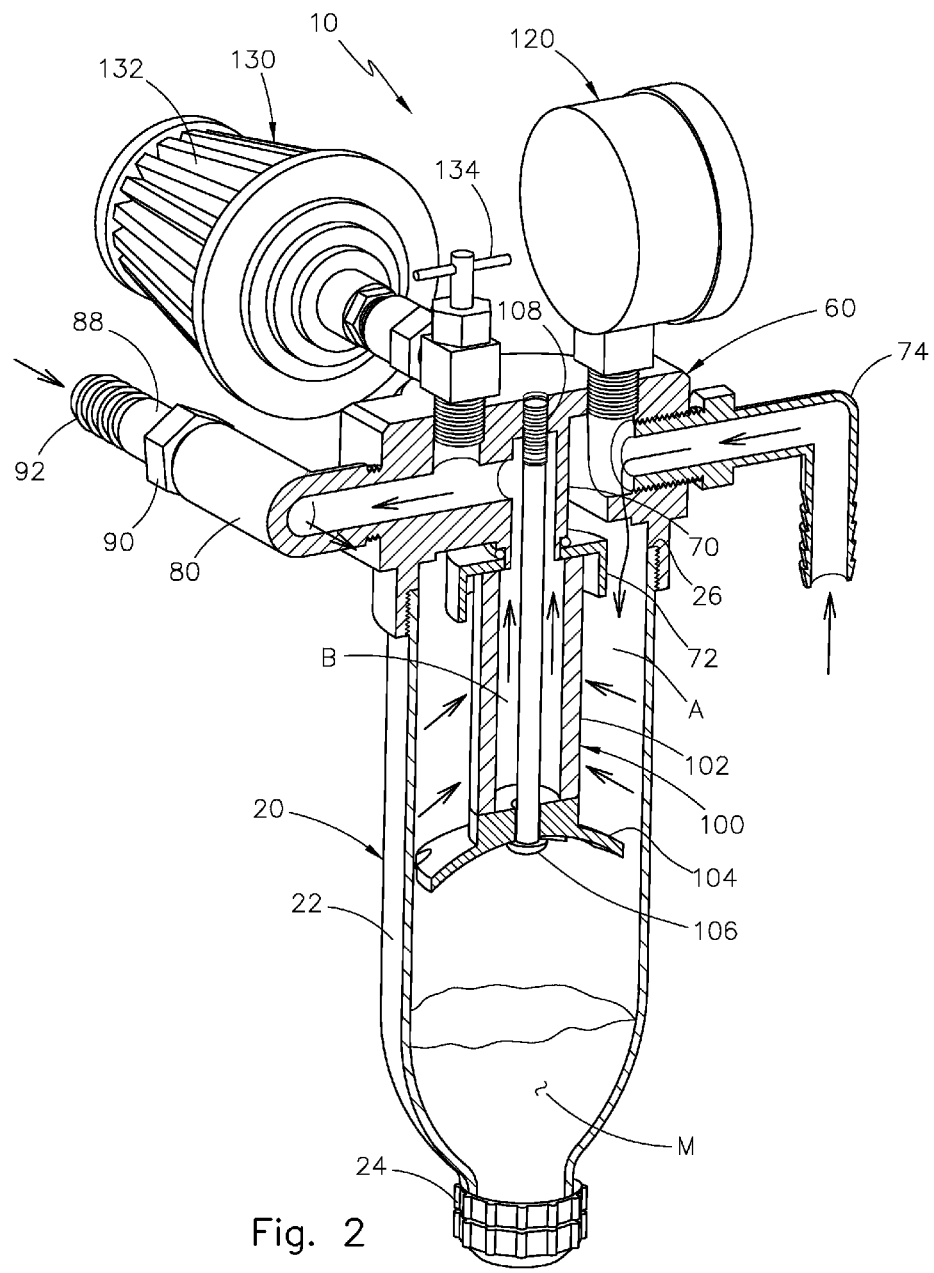
FIG. 2 is cross-sectional view of the residual gas cleaner, taken along the lines 2-2, as seen in FIG. 1.

As best seen in FIG. 2, housing 22 that is secured onto manifold assembly 60 at end 26. Filter assembly 100 comprises filter 102. Filter 102 fits within a cavity defined by receiving wall 72. Receiving wall 72 extends from internal wall 70 of manifold assembly 60. Filter 102 is housed within housing 22. In the preferred embodiment, filter 102 is elongated in shape to complement housing 22. Filter assembly 100 also comprises bolt 106 that is mounted to base 104. Bolt 106 has threaded portion 108 to secure filter 102 to manifold assembly 60. Filter 100 is made of predetermined layers of media.

Figure 3:
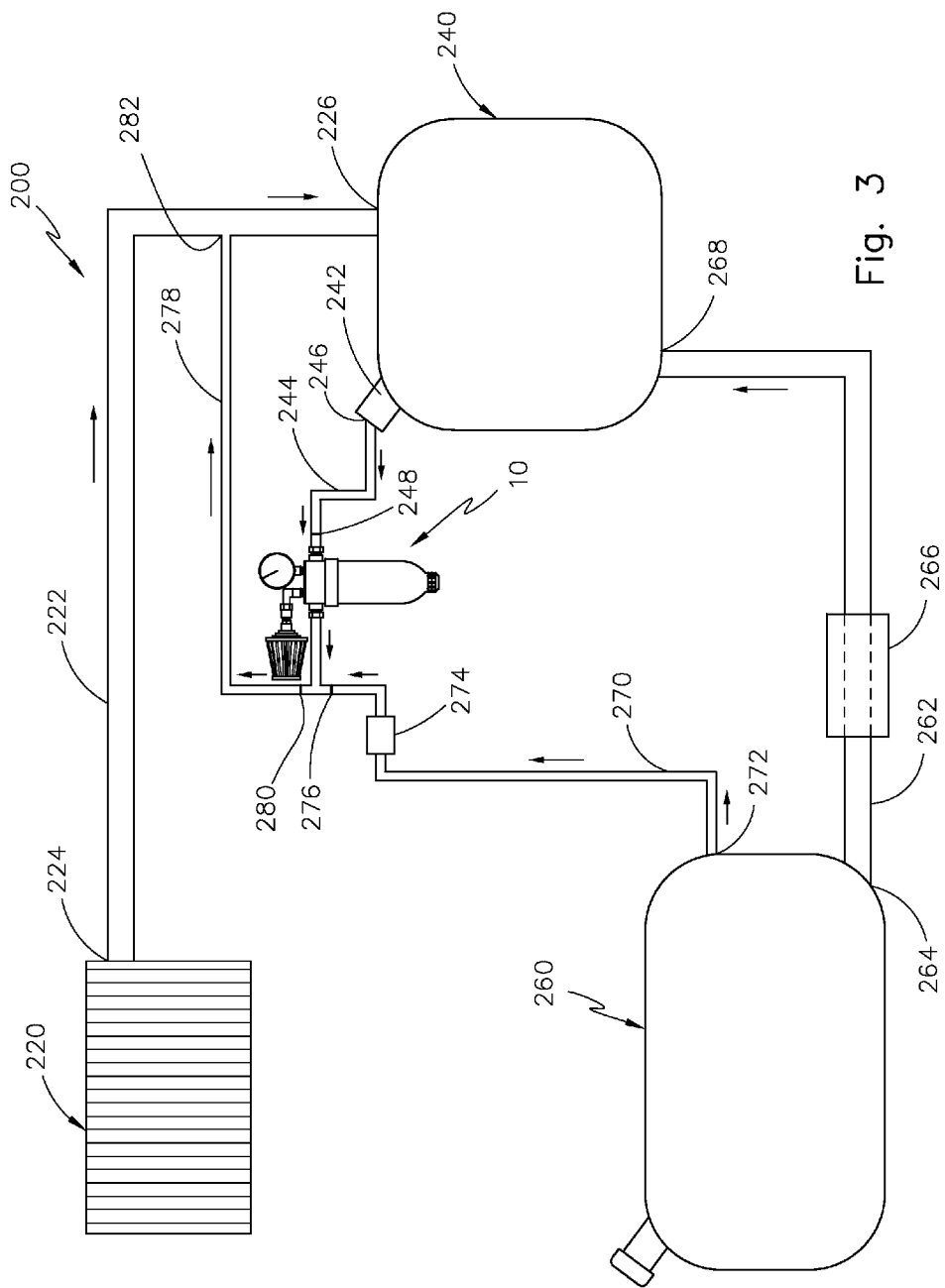
FIG. 3 is a schematic view of the residual gas cleaner, incorporated into an engine assembly.

As seen in FIG. 3, residual gas cleaner 10 is connected to engine assembly 200. Engine assembly 200 comprises air filter assembly 220, engine 240, and fuel tank assembly 260. Air filter assembly 220 comprises air filter line 222 having ends 224 and 226. End 224 originates from air filter assembly 220 and end 226 terminates at engine 240. Engine 240 comprises regulator 242, and exhaust gas line 244 having ends 246 and 248. End 246 originates from regulator 242 and end 248 terminates at instant invention 10. Fuel tank assembly 260 comprises fuel line 262 having ends 264 and 268. Fuel line 262 comprises fuel filter 266 positioned in between ends 264 and 268. End 264 originates from fuel tank assembly 260 and end 268 terminates at engine 240. Fuel tank assembly 260 also comprises clean gas line 270 having ends 272 and 276. Clean gas line 270 comprises EVP valve 274 positioned in between ends 272 and 276. End 272 originates from fuel tank assembly 260 and end 276 terminates at instant invention 10. Fuel tank assembly 260 further comprises recycle gas line 278 having ends 280 and 282. End 280 originates from instant invention 10 and end 282 terminates at air filter line 222. End 248 mounts onto inlet 74, end 276 mounts onto inlet 88, and end 280 mounts onto outlet 84. In the preferred embodiment, fuel tank assembly 260 contains gasoline or diesel fuel. Traditional components such as timing chains, gears etc. have not been depicted. It is understood that these components will be part of the final embodiment.

In operation, inlet 74 receives spent exhaust gas M from engine 240, and inlet 88 receives clean gas from fuel tank assembly 260. Regulator 242 controls the amount of spent exhaust gas M from engine 240 into instant invention 10, whereby regulator 242 produces vacuum pressure to inlet 74. The amount of clean gas from fuel tank assembly 260 is controlled by EVP valve 274. Instant invention 10, and specifically housing 22, collects spent exhaust gas M from engine 240. Spent exhaust gas M, comprising oil, foreign matter, and engine waste particles, remains exteriorly of filter 102 and within housing 22, defined as area A. Any spent exhaust gas M passing into the interior of filter 102, defined as area B, becomes filtered exhaust gas. Spent exhaust gas M remaining exteriorly of filter 102 collects by gravity within housing assembly 20 above threaded cap 24. Threaded cap 24 may be loosened or removed to drain spent exhaust gas M remaining exteriorly of filter 102. Filtered exhaust gas exits manifold assembly 60 through outlet 84. By the connection of T-fitting 80, filtered exhaust gas joins clean gas coming from EVP valve 274. The mixture of filtered exhaust gas and clean gas travels through recycle gas line 278 and into air filter line 222 at end 282. It is noted that engine 240 produces vacuum pressure to outlet 84.

Engine 240 receives the mixture of filtered exhaust gas and clean gas from outlet 84, and air from air filter assembly 220 to reduce engine emissions, and to reduce carbon build-up in carburetors, fuel injectors, and combustion chambers, maintaining them in a cleaner condition. This allows for better oxygenation of fuel molecules. The mixture of filtered exhaust gas and clean gas from outlet 84 also allows a more readily and more complete combustion in a firing chamber cylinder of a combustion engine. Consequently, it facilitates the combustion of a better, more complete, and cleaner burning of fuel. In addition, a significant reduction of polluting emissions is obtained.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A residual gas cleaner, comprising:
A) a manifold assembly having at least first and second inlets and at least an outlet, said first inlet receives spent exhaust gas from an engine, and said second inlet receives clean gas from a fuel tank assembly, said engine produces vacuum pressure to said outlet;
B) a housing assembly comprising a housing that is secured onto said manifold assembly, said housing collects said spent exhaust gas, said housing assembly further comprising draining means to drain said spent exhaust gas from said housing, said manifold assembly further comprises a pressure gauge assembly with determining means to determine pressure within said housing assembly, said manifold assembly further comprises an air filter assembly with filtering means to deliver filtered air to said housing assembly; and
C) a filter assembly comprising a filter extending from said manifold assembly and housed within said housing, said filter assembly filters said spent exhaust gas to create filtered exhaust gas, said filtered exhaust gas exits said manifold assembly through said outlet to join said clean gas, and said engine receives said filtered exhaust gas and said clean gas from said outlet.

2. The residual gas cleaner set forth in claim 1, further characterized in that said air filter assembly comprises a valve assembly with regulating means to regulate the amount of said filtered air delivered to said housing assembly.

3. The residual gas cleaner set forth in claim 1, further characterized in that said draining means comprises said housing having a threaded cap at a distal end opposite said manifold assembly to drain said spent exhaust gas from said housing.

4. The residual gas cleaner set forth in claim 1, further characterized in that said filter assembly comprises a bolt having a threaded portion to secure said filter to said manifold assembly.

5. The residual gas cleaner set forth in claim 3, further characterized in that said housing is elongated and said spent exhaust gas collects by gravity above said threaded cap.

6. The residual gas cleaner set forth in claim 1, further characterized in that said spent exhaust gas is exterior to said filter and said filtered exhaust gas is interior to said filter.

7. The residual gas cleaner set forth in claim 1, further characterized in that said filter is of predetermined layers of media.

8. The residual gas cleaner set forth in claim 1, further characterized in that said filter is elongated in shape to complement said housing.

9. A residual gas cleaner, comprising:
A) a manifold assembly having at least first and second inlets and at least an outlet, said first inlet receives spent exhaust gas from an engine, and said second inlet receives clean gas from a fuel tank assembly, said engine produces vacuum pressure to said outlet;
B) a housing assembly comprising a housing that is secured onto said manifold assembly, said housing collects said spent exhaust gas, said housing assembly further comprising draining means to drain said spent exhaust gas from said housing, said draining means comprises said housing having a threaded cap at a distal end opposite from said manifold assembly to drain said spent exhaust gas from said housing, said manifold assembly further comprises a pressure gauge assembly with determining means to determine pressure within said housing assembly, said manifold assembly further comprises an air filter assembly with filtering means to deliver filtered air to said housing assembly; and
C) a filter assembly comprises a filter extending from said manifold assembly and housed within said housing, said filter assembly filters said spent exhaust gas to create filtered exhaust gas, said filtered exhaust gas exits said manifold assembly through said outlet to join said clean gas, and said engine receives said filtered exhaust gas and said clean gas from said outlet, said spent exhaust gas is exterior to said filter and said filtered exhaust gas is interior to said filter, said filter is of predetermined layers of media, and said filter is elongated in shape to complement said housing.

10. The residual gas cleaner set forth in claim 9, further characterized in that said air filter assembly comprises a valve assembly with regulating means to regulate the amount of said filtered air delivered to said housing assembly.

11. The residual gas cleaner set forth in claim 9, further characterized in that said filter assembly comprises a bolt having a threaded portion to secure said filter to said manifold assembly.

12. The residual gas cleaner set forth in claim 9, further characterized in that said housing is elongated and said spent exhaust gas collects by gravity above said threaded cap.

13. A residual gas cleaner, comprising:
- A) a manifold assembly having at least first and second inlets and at least an outlet, said first inlet receives spent exhaust gas from an engine, and said second inlet receives clean gas from a fuel tank assembly, said engine produces vacuum pressure to said outlet, said manifold assembly further comprises a pressure gauge assembly with determining means to determine pressure within a housing assembly, said manifold assembly further comprises an air filter assembly with filtering means to deliver filtered air to said housing assembly;
- B) said housing assembly comprising a housing that is secured onto said manifold assembly, said housing collects said spent exhaust gas, said housing assembly further comprising draining means to drain said spent exhaust gas from said housing, said draining means comprises said housing having a threaded cap at a distal end opposite from said manifold assembly to drain said spent exhaust gas from said housing; and
- C) a filter assembly comprises a filter extending from said manifold assembly and housed within said housing, said filter assembly filters said spent exhaust gas to create filtered exhaust gas, said filtered exhaust gas exits said manifold assembly through said outlet to join said clean gas, and said engine receives said filtered exhaust gas and said clean gas from said outlet, said spent exhaust gas is exterior to said filter and said filtered exhaust gas is interior to said filter, said filter is of predetermined layers of media, and said filter is elongated in shape to complement said housing.

14. The residual gas cleaner set forth in claim 13, further characterized in that said air filter assembly comprises a valve assembly with regulating means to regulate the amount of said filtered air delivered to said housing assembly, said filter assembly comprises a bolt having a threaded portion to secure said filter to said manifold assembly, said housing is elongated and said spent exhaust gas collects by gravity above said threaded cap.

* * * * *